(12) United States Patent
Doelle et al.

(10) Patent No.: US 6,254,729 B1
(45) Date of Patent: Jul. 3, 2001

(54) PULPER WITH EXTRACTION PLATE ASSEMBLY HAVING REMOVABLE INSERTS AND METHOD OF MANUFACTURING SAME

(75) Inventors: Klaus Doelle; Kurt William Lorenz, both of Appleton; Steve Richard Wickesberg, Reedsville, all of WI (US)

(73) Assignee: Voith Sulzer Paper Technology North America, Inc., Appleton, WI (US)

( * ) Notice: Subject to any disclaimer, the term of this patent is extended or adjusted under 35 U.S.C. 154(b) by 0 days.

(21) Appl. No.: 09/274,441

(22) Filed: Mar. 22, 1999

(51) Int. Cl.⁷ .............................. D21C 7/00; D21D 1/00; B07B 1/20; B07B 1/49; B01D 29/07

(52) U.S. Cl. .................. 162/251; 162/261; 209/306; 209/397; 209/399; 210/498; 210/415

(58) Field of Search .................. 162/55, 261, 251; 209/306, 273, 250, 397, 399; 210/498, 497.01, 415, 488, 489

(56) References Cited

U.S. PATENT DOCUMENTS

| | | | |
|---|---|---|---|
| 2,527,772 | 10/1950 | Stapley et al. | 92/26 |
| 3,713,595 | 1/1973 | Craig et al. | 241/46.11 |
| 3,885,745 | 5/1975 | Hankes et al. | 241/46.11 |
| 4,657,636 | 4/1987 | Satomi | 162/261 |
| 4,795,560 | 1/1989 | Chupka et al. | 210/497.01 |
| 4,880,171 | 11/1989 | Garrett | 241/46.11 |
| 5,435,444 | 7/1995 | Satomi | 209/234 |
| 5,614,093 | * 3/1997 | Mueggenburg et al. | 210/355 |
| 5,665,207 | 9/1997 | Aikawa | 162/261 |
| 5,798,025 | 8/1998 | Iwashige | 162/261 |
| 5,966,810 | * 10/1999 | Chisnell et al. | 29/890.06 |

FOREIGN PATENT DOCUMENTS

| | | | |
|---|---|---|---|
| 932670 | 8/1973 | (CA) | 182/110 |
| 1329333 | 5/1994 | (CA) | B07B/1/22 |
| 1 180 617 | 10/1964 | (DE) | . |
| 25 32 375 | 2/1977 | (DE) | B07B/1/46 |
| 197 02 044C1 | 4/1998 | (DE) | B01D/35/28 |
| 0 275 967 A2 | 7/1988 | (EP) | D21D/5/06 |
| 1242086 | 8/1971 | (FR) | B07B/1/18 |
| 0 562 930 A1 | 3/1993 | (FR) | D21D/5/16 |

* cited by examiner

Primary Examiner—Stanley S. Silverman
Assistant Examiner—Dionne A. Walls
(74) Attorney, Agent, or Firm—Taylor & Aust, P.C.

(57) ABSTRACT

A pulper for pulping a fiber suspension includes a vessel, an extraction plate assembly and a rotor. The extraction plate assembly is disposed within the vessel and includes a metal plate with a plurality of holes extending therethrough. A plurality of metal inserts are respectively disposed within the holes and project from the plate. Each insert is removably attached to the plate. A rotor is disposed within the vessel adjacent to the extraction plate assembly. The inserts are removably attached to the plate by brazing the inserts within the holes, or slightly shrinking the inserts using liquid nitrogen and placing the inserts in the holes.

11 Claims, 2 Drawing Sheets

PULPER WITH EXTRACTION PLATE ASSEMBLY HAVING REMOVABLE INSERTS AND METHOD OF MANUFACTURING SAME

BACKGROUND OF THE INVENTION

1. Field of the Invention

The present invention relates to pulpers for a fiber suspension, and, more particularly, to pulpers having an extraction plate for separating good fibers from effluent.

2. Description of the Related Art

A pulper is used for making fibers which are used in a fiber suspension in a paper-making machine. The source of fiber may be, e.g., wood fiber in the form of virgin fiber or recycled fiber. The pulper grinds the source of fiber into individual fibers which are used in the fiber suspension in a paper-making machine.

It is known to use a pulper with a screen plate and a rotor which are disposed within a vessel. The rotor causes the source of fiber to rotate past the screen plate. Good fiber passes through a plurality of holes in the screen plate for further processing, while undesirable substances such as foreign matter, etc., do not pass through the holes in a screen plate and may be discarded.

It is also known to provide a screen plate with inserts which are respectively disposed within corresponding holes in a screen plate. The inserts are irremovably attached to the screen plate, such as by arc welding. The inserts may become worn over time. To replace the inserts, the screen plate must be removed from the pulper and the inserts are ground off flush with the screen plate. Additionally, it is often necessary to drill out the inserts after the grinding operation since the penetration depth of the weld also extends into the screen plate. For these reasons, it is very difficult to replace the inserts in a conventional screen plate. In fact, it is often times less expensive to simply scrap and replace the screen plate.

What is needed in the art is a screen plate which may be easily repaired when the inserts become worn through use.

SUMMARY OF THE INVENTION

The present invention provides a pulper with an extraction plate assembly with a plurality of inserts which are removably attached to a wear plate.

The invention comprises, in one form thereof, a pulper for pulping a fiber suspension, including a vessel, an extraction plate assembly and a rotor. The extraction plate assembly is disposed within the vessel and includes a metal plate with a plurality of holes extending therethrough. A plurality of metal inserts are respectively disposed within the holes and project from the plate. Each insert is removably attached to the plate. A rotor is disposed within the vessel adjacent to the extraction plate assembly. The inserts are removably attached to the plate by brazing the inserts within the holes, or slightly shrinking the inserts using liquid nitrogen and placing the inserts in the holes.

An advantage of the present invention is that the inserts can be replaced without removing the extraction plate assembly and without disassembling the entire pulper.

Another advantage is that the inserts can be relatively easily changed from one shape to another, depending upon the specific application.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
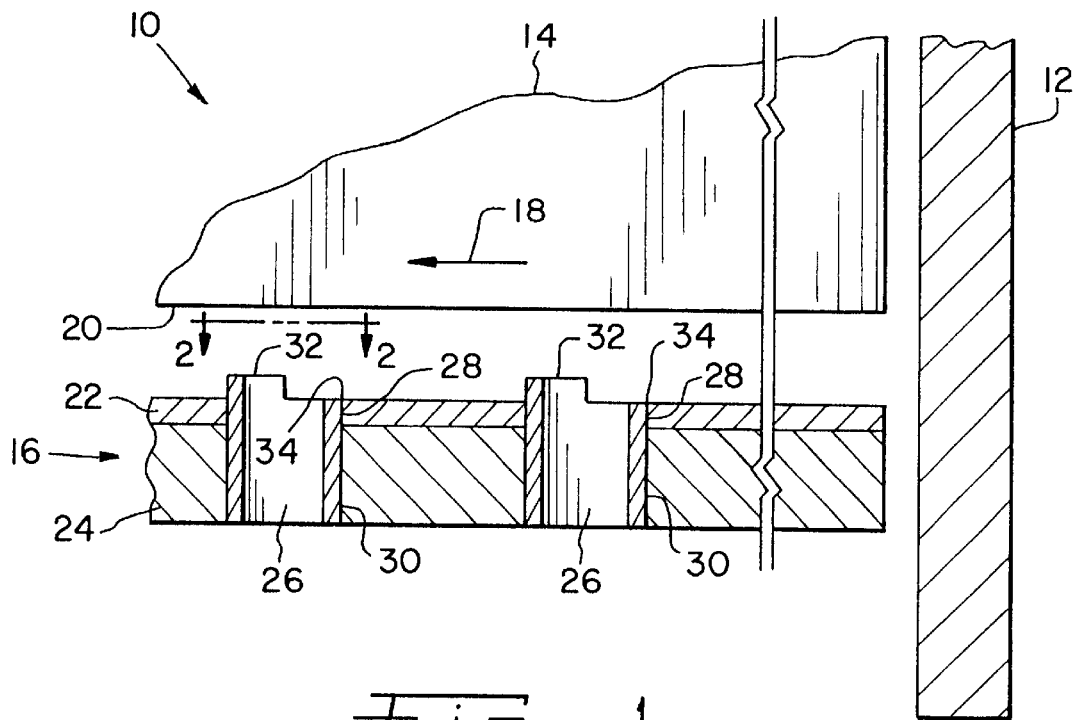
FIG. 1 is a fragmentary, side view of a pulper including an embodiment of an extraction plate assembly of the present invention.

Corresponding reference characters indicate corresponding parts throughout the several views. The exemplifications set out herein illustrates one preferred embodiment of the invention, in one form, and such exemplifications are not to be construed as limiting the scope of the invention in any manner.

DETAILED DESCRIPTION OF THE INVENTION

Figures 2, 3:
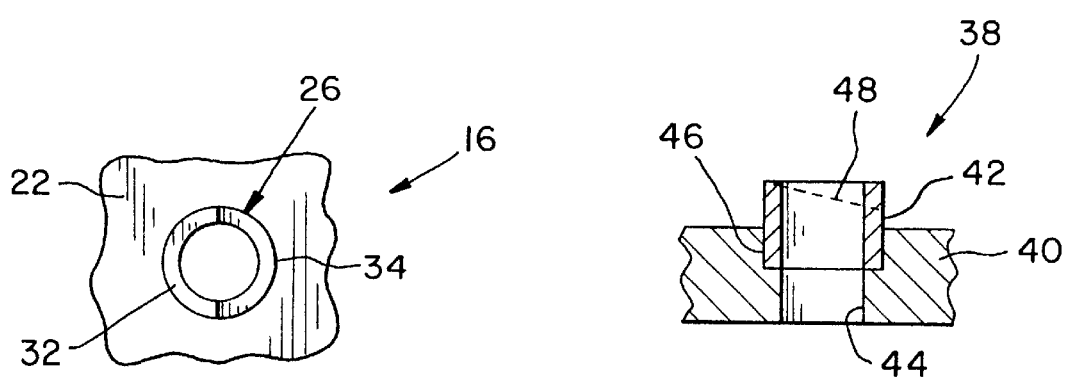
FIG. 2 is a fragmentary, top view taken along line 2—2 in FIG. 1.
FIG. 3 is a fragmentary, side view of another embodiment of an extraction plate assembly of the present invention.

Referring now to the drawings, and more particularly to FIGS. 1 and 2, there is shown an embodiment of a flat plate screening machine 10 of the present invention, which generally includes a vessel 12, rotor 14 and extraction plate assembly 16. In the embodiment shown in the drawings, flat plate screening machine 10 is assumed to be a pulper for purposes of illustration. However, it is to be understood that flat plate screening machine 10 may be any other type of machine which is used to process fiber or a fiber suspension, such as a fiber sorter or turbo separator.

Vessel 12 can be of any suitable configuration, such as a closed top or open top vessel. For ease of illustration, only one wall of vessel 12 is shown in FIG. 1.

Rotor 14 is disposed within vessel 12, and has a generally circular cross-section when viewed from the top of FIG. 1. When rotated in a clockwise direction as viewed from the top, a portion of rotor 14 closest to the plane of viewing in FIG. 1 moves from right to left, as indicated by arrow 18, and a portion adjacent to the illustrated side wall of vessel 12 moves in a direction toward the viewing plane of FIG. 1. Rotor 14 is shown with a smooth bottom surface 20 for ease of illustration, but likely includes a contoured surfaced or projections extending from bottom surface 20 which assist in inducing a circular flow of the fiber suspension between rotor 14 and extraction plate assembly 16.

Extraction plate assembly 16 is disposed within vessel 12, and generally includes a wear plate 22, base plate 24 and a plurality of inserts 26. Wear plate 22 is formed from steel, such as stainless steel, and includes a plurality of holes 28 extending therethrough in a direction generally perpendicular to rotational direction 18 of rotor 14. In the embodiment shown, wear plate 22 has a thickness in a direction transverse to rotational direction 18 of approximately 3/16 inch. Base plate 24 lies immediately adjacent to wear plate 22, and includes a plurality of holes 30 which are aligned generally concentrically with holes 28 in wear plate 22. Holes 30 in base plate 24 and holes 28 in wear plate 22 each have an inside diameter which is approximately the same. In the embodiment shown, base plate 24 has a thickness in a direction transverse to rotational direction 18 of between approximately ½ and ¾ inch. Extraction plate assembly 16 may be configured to rotate about a longitudinal axis thereof and relative to rotor 14.

The plurality of inserts 26 are respectively disposed in each pair of aligned holes 28 and 30 in wear plate 22 and base plate 24. Each insert 26 is formed from steel, such as stainless steel, in the embodiment shown. Each insert 26 is in the form of a pipe or hollow cylinder with an end 32 which projects from a side of wear plate 22 which is adjacent to rotor 14. End 32 of each insert 26 is partially machined off on the leading edge 34 thereof (relative to the rotational direction 18) such that a hemispherical portion remains when viewed in cross-section (FIG. 2). The hemispherical shape of end 32 which projects from wear plate 22 provides very good pulping of the fiber disposed between rotor 14 and extraction plate assembly 16. The pipe configuration of each insert 26 allows standard pipe stock to be used for each insert 26, thereby providing easy and inexpensive fabrication of each insert 26.

According to an aspect of the present invention, each insert 26 is removably attached to wear plate 22 and base plate 24, thereby allowing some or all of inserts 26 to be replaced within pulper 10 without entirely disassembling pulper 10. That is, extraction plate assembly 16 may remain within pulper 10 and inserts 26 may be easily replaced within pulper 10. More particularly, in the embodiment of pulper 10 shown in FIGS. 1 and 2, each insert 26 is metallurgically bonded to wear plate 22 and base plate 24 with a metal having a melting temperature which is lower than a melting temperature of the steel from which wear plate 22, base plate 24 and inserts 26 are formed.

During manufacture, each insert 26 is positioned within the concentrically aligned holes 28 and 30 of wear plate 22 and base plate 24. Each insert 26 is then heated, such as by using an oxygen/acetylene torch, and a brazing alloy such as a copper and/or nickel alloy is wicked into the annular space between each insert 26 and the inside diameter of the corresponding holes 28 and 30. By using a brazing alloy with a melting temperature which is lower than the material(s) from which wear plate 22, base plate 24 and inserts 26 are formed, the inserts 26 may be easily installed within extraction plate assembly 16.

To remove an insert 26, a torch may again be used to heat the insert 26 to a temperature at which the brazing alloy melts. The heated insert 26 may then be easily pulled from within the corresponding holes 28 and 30. After removing the used or worn insert 26, a new insert may then be easily replaced within the concentrically aligned holes 28 and 30.

Referring now to FIG. 3, there is shown another embodiment of an extraction plate assembly 38 of the present invention, including an extraction plate 40 and a plurality of inserts (one of which is shown and referenced 42). Plate 40 includes a plurality of holes (one of which is shown and referenced 44), with each hole 44 having an annular recess 46 which extends partially through plate 40. Insert 42 is disposed within annular recess 46 of hole 44 such that an interference fit exists therebetween. Insert 42 is in the form of a pipe or hollow cylinder which is disposed within annular recess 46 and projects from plate 40. Insert 42 may have a generally flat distal surface as shown, or may be disposed at an inclined angle indicated by phantom line 48.

During manufacture, insert 42 is placed within a liquid nitrogen bath and thereby caused to contract slightly. The contracted insert 42 is then placed within annular recess 46 and allowed to warm to an ambient room temperature. Insert 42 expands slightly upon being warmed to the ambient room temperature, thereby forming an interference fit within annular recess 46 of plate 40.

Figure 4:
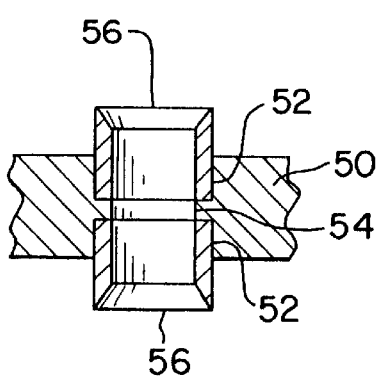
FIG. 4 is a fragmentary, side view of yet another embodiment of an extraction plate assembly of the present invention.

FIG. 4 is similar to the embodiment of extraction plate assembly 38 shown in FIG. 3, with the primary difference being that plate 50 includes a pair of annular recesses 52 at opposite ends of each hole 54. A pair of inserts 56 are respectively disposed in the pair of annular recesses 52 at each end of hole 54. Inserts 56 are again placed within a liquid nitrogen bath, thereafter placed within the annular recesses 52, and allowed to expand upon warming to the ambient temperature to cause an interference fit within each annular recess 52. Inserts 56 have a beveled working edge with a relatively sharp edge defined at the outside diameter thereof.

Figure 5:
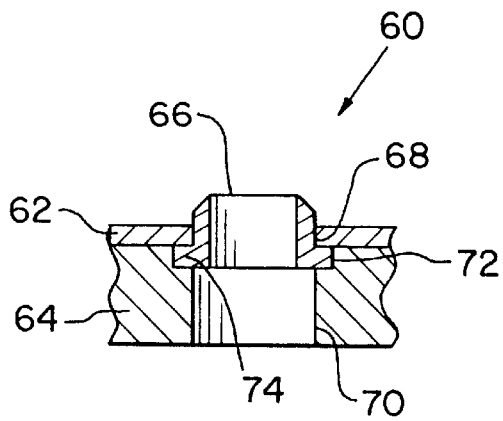
FIG. 5 is a fragmentary, side view of still another embodiment of an extraction plate assembly of the present invention.

Referring now to FIG. 5, another embodiment of an extraction plate assembly 60 of the present invention is shown. Extraction plate assembly 60 generally includes a wear plate 62, base plate 64 and a plurality of inserts 66 (one of which is shown). Wear plate 62 and base plate 64 each include a hole 68 and 70, respectively. Hole 70 in base plate 64 also includes an annular recess 72 adjacent to wear plate 62. Each insert 66 includes a radially projecting flange 74 which is disposed within a corresponding annular recess 72. Annular recess 72 and flange 74 thus hold insert 66 in place within extraction plate assembly 60. Insert 66 may be further removably attached to wear plate 62 and/or base plate 64 using a brazing alloy or liquid nitrogen to form an interference fit, as described above with reference to the embodiment of FIGS. 1–2 and 3–4. Insert 66 has a beveled working edge with a relatively sharp edge defined at the inside diameter thereof.

Figure 6:
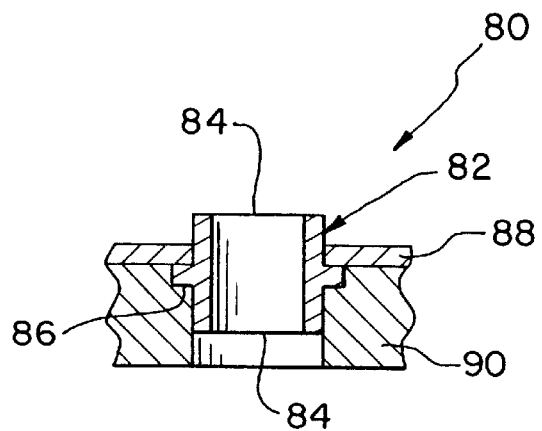
FIG. 6 is a fragmentary, side view of a further embodiment of an extraction plate assembly of the present invention.

Referring now to FIG. 6, yet another embodiment of an extraction plate assembly 80 of the present invention is shown. Extraction plate assembly 80 shown in FIG. 6 is similar to the embodiment of extraction plate 60 shown in FIG. 5. However, extraction plate 80 includes a plurality of inserts 82 (one of which is shown). Inserts 82 are reversible to provide extended life within extraction plate assembly 80. Opposite ends 84 of each insert 82 extend substantially the same distance from a flange 86 in an axial direction. If one end 84 of insert 82 becomes worn, wear plate 88 may be removed from base plate 90, such as by removing bolts connecting therebetween, and insert 82 may be flipped end for end to provide a new wear surface within extraction plate assembly 80.

In the embodiment of the present invention illustrated in FIGS. 3 and 4, inserts 42 and 56 are disposed within corresponding annular recesses 46 and 52 using an interference fit which is formed by placing inserts 42 and 56 within a liquid nitrogen bath and allowing inserts 42 and 56 to expand within annular recesses 46 and 52. However, it is also to be appreciated that the interference fit can be formed by heating plates 40 or 50 to cause the inside diameter of annular recesses 46 and 52, respectively, to expand. Inserts 42 and 56 may be placed within the heated plates 40 or 50 and the entire assembly cooled such that annular recesses 46 and 52 radially-contract against and form an interference fit with inserts 42 and 56. Plates 40 and 50 may be heated using an oxygen/acetylene torch, or by placing the entire plate 40 or 50 within an oven or other heating source.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flat plate screening machine for processing fiber or a fiber suspension, said pulper comprising:

a vessel;

an extraction plate assembly disposed within said vessel, said extraction plate assembly including a metal plate with a plurality of holes extending therethrough and a plurality of metal inserts, each said insert disposed within a corresponding said hole and projecting from said plate, each said insert being removably attached to said plate; and a rotor disposed within said vessel adjacent said extraction plate assembly.

2. The flat plate screening machine of claim 1, wherein each said insert is metallurgically bonded to said plate with a metal having a melting temperature which is lower than a melting temperature of each of said plate and said plurality of inserts.

3. The flat plate screening machine of claim 1, wherein said plate and said inserts are each formed from steel, and wherein each of said inserts are metallurgically bonded to said plate with a brazing alloy.

4. The flat plate screening machine of claim 3, wherein said brazing alloy consists of at least one of a copper and nickel alloy.

5. The flat plate screening machine of claim 1, wherein each said insert is attached only by an interference fit with a corresponding said hole in said plate.

6. The flat plate screening machine of claim 1, wherein each of said plurality of inserts comprises a hollow cylinder with an end which projects from said plate and is partially machined off.

7. The flat plate screening machine of claim 6, wherein approximately one-half of each said end is machined off on a leading edge of each said insert when viewed in cross-section, relative to a direction of rotation of said rotor.

8. The flat plate screening machine of claim 1, wherein said plate comprises a wear plate, and further comprising a base plate disposed adjacent to and attached with said wear plate, said base plate including a plurality of holes which generally concentrically align with said holes in said wear plate when said base plate is attached with said wear plate, said wear plate having a thickness of at least approximately $3/16$th of an inch.

9. The flat plate screening machine of claim 1, wherein each of said plurality of holes includes an insert therein.

10. A flat plate screening machine for processing fiber or a fiber suspension, said pulper comprising:

a vessel;

an extraction plate assembly disposed within said vessel, said extraction plate assembly including a metal plate with a plurality of holes extending therethrough and a plurality of metal inserts, each said insert disposed within a corresponding said hole and projecting from said plate, each said insert being removably attached to said plate, said plate comprising a wear plate, and further comprising a base plate disposed adjacent to and attached with said wear plate, said base plate including a plurality of holes which generally concentrically align with said holes in said wear plate when said base plate is attached with said wear plate, each of said holes in said base plate including an annular recess adjacent to said wear plate, and wherein each of said inserts includes a radially projecting flange which is disposed within a corresponding said annular recess; and a rotor disposed within said vessel adjacent said extraction plate assembly.

11. The flat plate screening machine of claim 10, wherein said radially projecting flange of each said insert is positioned between opposite ends of each said insert, and each said insert is reversible within said corresponding annular recess.

* * * * *